United States Patent [19]

Baker et al.

[11] 4,178,353

[45] Dec. 11, 1979

[54] PREPARATION AND PURIFICATION OF PHOSPHORYL CHLORIDE

[75] Inventors: Joseph W. Baker; Dario R. Cova; James E. White, St. Louis, Mo.

[73] Assignee: Monsanto Company, St. Louis, Mo.

[21] Appl. No.: 601,895

[22] Filed: Aug. 4, 1975

Related U.S. Application Data

[63] Continuation-in-part of Ser. No. 549,646, Feb. 13, 1975, abandoned, which is a continuation of Ser. No. 187,832, Oct. 8, 1971, abandoned.

[51] Int. Cl.$^2$ ............................................. C01B 25/10
[52] U.S. Cl. .................................................. 423/300
[58] Field of Search ...................................... 423/300

[56] References Cited

U.S. PATENT DOCUMENTS

3,052,520   9/1962   Draeger et al. ...................... 423/300

OTHER PUBLICATIONS

The Condensed Chemical Dictionary, 6th Ed., 1962, p. 839.

*Primary Examiner*—O. R. Vertiz
*Assistant Examiner*—Gregory A. Heller
*Attorney, Agent, or Firm*—James C. Logomasini; Paul L. Passley; Stanley M. Tarter

[57] ABSTRACT

Residual $PCl_3$ in $POCl_3$ which has been prepared by the oxidation of $PCl_3$ in the presence of air or oxygen-enriched air is converted to $POCl_3$ by contacting the $POCl_3/PCl_3$ mixture with ozone or an ozone-enriched gas.

5 Claims, No Drawings

PREPARATION AND PURIFICATION OF PHOSPHORYL CHLORIDE

CROSS REFERENCES TO RELATED APPLICATIONS

This application is a continuation-in-part of copending application Ser. No. 549,646, filed Feb. 13, 1975 now abandoned which, in turn, is a continuation of application Ser. No. 187,832, filed Oct. 8, 1971, now abandoned.

BACKGROUND OF THE INVENTION

This invention relates to purification of phosphoryl chloride. More particularly, the invention relates to the removal of residual phosphorus trichloride from phosphoryl chloride which has been prepared by the oxidation of phosphorus trichloride in air or other oxygen-containing gas.

Phosphoryl chloride is ordinarily prepared by the oxidation of phosphorus trichloride with an oxygen-containing gas (i.e., air or oxygen is bubbled through liquid phosphorus trichloride). During such preparation of phosphoryl chloride, the rate of conversion decreases as less and less phosphorus trichloride is available for reaction due to the dilution of the phosphorus trichloride by the phosphoryl chloride product. Accordingly, conversion of the last, very dilute amounts of phosphorus trichloride is very difficult. Economics dictate that at some predetermined point, the oxidation must be discontinued in view of the time and energy expended. Ordinarily, the conversion is discontinued while a certain amount of phosphorus trichloride remains unconverted. At the present time, phosphoryl chloride, which is prepared by the oxidation of phosphorus trichloride with oxygen, is purified by removal of residual phosphorus trichloride by distillation procedures. Such distillation procedures are, however, time consuming and cannot remove all traces of phosphorus trichloride. Accordingly, it would be of great advantage to be able to purify phosphoryl chloride, which contains residual phosphorus trichloride, without using distillation procedures.

SUMMARY OF THE INVENTION

In accordance with the present invention, it has been found that phosphoryl chloride, containing residual amounts of phosphorus trichloride, may be rendered essentially free of phosphorus trichloride (i.e., no phosphorus trichloride is detectable by a gas-liquid chromatograph (GLC) sensitive to 0.001 percent by weight of phosphorus trichloride) by contacting the phosphoryl chloride/phosphorus trichloride mixture with ozone or an ozone-enriched gas.

DESCRIPTION OF THE PREFERRED EMBODIMENT

In accordance with the present invention, phosphoryl chloride which, for any reason, contains detectable levels of phosphorus trichloride (i.e., at least 0.001 weight percent by GLC procedures) is rendered essentially free of phosphorus trichloride.

As is known, ozone is produced by a silent electrical discharge in air or oxygen. Ozone used in the present invention is generated in a commercial device commonly known as an ozonator. Ozone may be supplied undiluted from the ozonator or it may be commingled with a carrier gas such as oxygen, air, nitrogen, carbon dioxide or other gaseous stream.

The composition of the earth's atmosphere is commonly represented as follows:

| Element | Vol. % |
|---|---|
| Nitrogen | 78.03 |
| Oxygen | 20.99 |
| Argon | 0.933 |
| $CO_2$ | $3 \cdot 10^{-2}$ |
| Hydrogen | $1 \times 10^{-2}$ |
| Neon | $1.5 \times 10^{-3}$ |
| Helium | $5 \times 10^{-31\,4}$ |
| Krypton | $1.1 \times 10^{-4}$ |
| Xenon | $0.8 \times 10^{-5}$ |

Ozone is not generally considered a normal component of the atmosphere near the earth since it may or may not be present. Generally, the atmosphere close to earth is considered to have an ozone concentration of from about zero to about 0.5 parts per million (i.e., $0.5 \times 10^{-4}$ vol. percent). Thus, the belief held by many—that air contains ozone—is not necessarily technically correct. Air may, or may not, contain ozone and if it does, the ozone is present in only extremely low concentrations.

In accordance with the present invention, ozone is used undiluted or is combined with another gas at a concentration of from about 0.01 to about four percent by volume of ozone. Generally, the use of a mixture of a gas, such as air or oxygen containing from about one to about four percent by volume of ozone produces good results. Preferably, an ozone/gas mixture is used wherein the ozone concentration is approximately one percent by volume.

The temperature at which a phosphoryl chloride/phosphorus trichloride mixture is contacted by ozone or an ozone-enriched gas may be any temperature above approximately 0° C., although a preferred range is from 20° to 50° C.

Normally, the pressure at which the reaction is run is of no great significance although for practical purposes, a pressure of 1 to 2 atmospheres is used. The time during which phosphoryl chloride is contacted with ozone, the ratio of ozone to phosphoryl chloride and the ratio of ozone to oxygen or other carrier or oxidizing gas are not critical but are interdependent. Thus, a given concentration of phosphorus trichloride in a given amount of phosphoryl chloride can be converted by a high ozone feed rate over a short period of time or a low ozone feed rate over a longer period of time and both the time and ozone/oxygen or other gas ratio are dependent also upon whether the concentration of phosphorus trichloride in the phosphoryl chloride is a high or low value. For example, it has been found that it may take from about one to six hours at 20°–50° C. to convert 0.10 weight percent phosphorus trichloride in a 20,000 pound batch of phosphoryl chloride with an ozone/oxygen mixture wherein the concentration of ozone in oxygen is 1.7 percent by weight (1.1 vol. %) and wherein the ratio of ozone to phosphoryl chloride is $8.7 \times 10^{-5}$ pounds of ozone per pound of phosphoryl chloride after six hours of contact time.

The process of the invention is useful for converting any amount of residual phosphorus trichloride but the upper concentration limit of residual phosphorus trichloride which may safely be converted by the process of the invention is approximately five weight percent of phosphorus trichloride in phosphoryl chloride. Above about five weight percent residual phosphorus trichloride, the process could become hazardous because of the high reactivity of ozone and, therefore, the high level of heat evolution which would be involved. At lower phosphorus trichloride levels, however, the heat evolution is lower and no particular hazard is involved. The usual concentration of residual phosphorus trichloride which is converted by the process of the invention is from about 0.01 to about 1 percent by weight. Typically, residual phosphorus trichloride levels range from about 0.05 to about 0.20 percent by weight of the phosphoryl chloride.

The ranges of reaction parameters discussed are not critical and may be manipulated to adapt to plant application and the handling of phosphoryl chloride.

In general, increasing the temperature decreases the $PCl_3$ removal rate and increasing pressure, ozone/oxygen concentration and liquid-gas contact increases the removal rate.

The following examples will serve to illustrate certain non-limiting embodiments within the scope of this invention.

EXAMPLE 1

This example illustrates the conversion of residual phosphorus trichloride is phosphoryl chloride.

Ozone is produced by a Welsbach Model T-23 Generator. The ozone concentration in oxygen is measured using the potassium iodide scrubbing technique described in the Welsbach Ozone Generator Operators Manual. Phosphorus trichloride concentrations are determined by a gas-liquid chromatograph with sensitivity to 0.001 percent phosphorus trichloride in phosphoryl chloride.

Two thousand grams of phosphoryl chloride containing 0.10 percent phosphorus trichloride (by GLC analysis) are placed in a 4-neck, 2 liter, round bottom, stirred glass pot. The pot is equipped with a heating mantle, a cold water condenser, a thermometer and a subsurface glass gas-sparger tube. The phosphoryl chloride is stirred at 155 rpm using a two inch diameter blade and a mixture of oxygen and ozone is fed through the sparge tube. Five cubic centimeter samples of phosphoryl chloride are withdrawn periodically for GLC analysis to determine the concentration of phosphorus trichloride.

The flow rate of ozone-oxygen mixture to the pot is at a rate of 0.01 cubic feet per minute and the concentration of ozone in oxygen is 0.626 grams per cubic foot. The temperature of the pot is maintained at 23.5° to 25.8° C. at a pressure of 1 atmosphere. The glass pot is covered by black tape to eliminate any possible initiation effect due to light.

The results are shown in Table I below.

TABLE I

| Sparge Time (Minutes) | PCl₃ Concentration (Percent) |
|---|---|
| 0 | 0.10 |
| 2 | 0.056 |
| 4 | 0.021 |
| 6 | 0.003 |
| 8 | trace |
| 10 | none detectable |
| 15 | none detectable |
| 23 | none detectable |

Within ten minutes, the concentration of phosphorus trichloride is not detectable by GLC procedure sensitive to 0.001 percent phosphorus trichloride. Similar results obtained when undiluted ozone is used or when ozone/oxygen mixtures are used having ozone concentrations of 0.01, 0.05, 0.10, 0.20, 0.50, 0.70, 1.0, 2.0, 3.0 and 4.0 percent by volume. Similar concentrations of ozone in air, nitrogen and carbon dioxide produce beneficial results.

EXAMPLE 2

The process of Example 1 is repeated except that oxygen alone is used instead of an ozone/oxygen mixture and the stirred pot is not covered with tape.

The flow rate of oxygen to the pot is 0.51 cubic feet per hour. The temperature of the pot is maintained at 25° C. at a pressure of 1 atmosphere. One thousand six hundred seventy-five grams of phosphoryl chloride containing 0.1 percent phosphorus trichloride are placed in the pot and oxygen is fed to the mixture for a period of four hours. The results are shown in Table II below.

TABLE II

| Sparge Time (Minutes) | PCl₃ Concentration (Percent) |
|---|---|
| 0 | 0.104 |
| 15 | 0.100 |
| 30 | 0.110 |
| 60 | 0.100 |
| 240 | 0.110 |

Using oxygen alone, none of the residual phosphorus trichloride is removed even after four hours.

It is noteworthy that during the ten minute treatment of Example 1, the phosphoryl chloride was contacted with a total of 0.1 cubic feet of the ozone/oxygen mixture and that during the four hour oxygen treatment of Example 2, the phosphoryl chloride was contacted with 2.04 cubic feet of oxygen, i.e., 20.4 times more oxidizing gas than was used in Example 1.

While the invention has been described hereinabove with regard to certain illustrated specific embodiments, it is not so-limited since many modifications and variations are possible in light of the above teachings. It is understood therefore that the invention may be practiced otherwise than as specifically described without departing from the spirit and scope of the invention.

The embodiments of the invention in which an exclusive property or privilege is claimed are as follows:

1. In a process for preparing phosphoryl chloride by oxidation of phosphorus trichloride wherein the phosphoryl chloride product thus-afforded contains a residual amount of phosphorus trichloride, the improvement wherein said residual phosphorus trichloride is converted to phosphoryl chloride by contacting said phosphoryl chloride/phosphorus trichloride product mixture with undiluted ozone or an ozone-enriched gas containing from about 0.01 to about 4 percent ozone by volume for a time sufficient to afford phosphoryl chloride essentially free of phosphorus trichloride.

2. Process of claim 1 wherein said product mixture is contacted with ozone.

3. Process of claim 1 wherein said product mixture is contacted with an ozone-enriched gas.

4. Process of claim 3 wherein said gas is oxygen.

5. Process of claim 3 wherein said gas is air.

* * * * *